March 14, 1967 R. HOLLIS ETAL 3,308,843
VISCOSITY CONTROL APPARATUS
Filed June 24, 1963 4 Sheets-Sheet 1

INVENTORS
Raymond Hollis
Frank X. Barr
BY
Stone, Nierman,
Burmeister & Zummer Attys.

March 14, 1967 R. HOLLIS ETAL 3,308,843
VISCOSITY CONTROL APPARATUS
Filed June 24, 1963 4 Sheets-Sheet 2
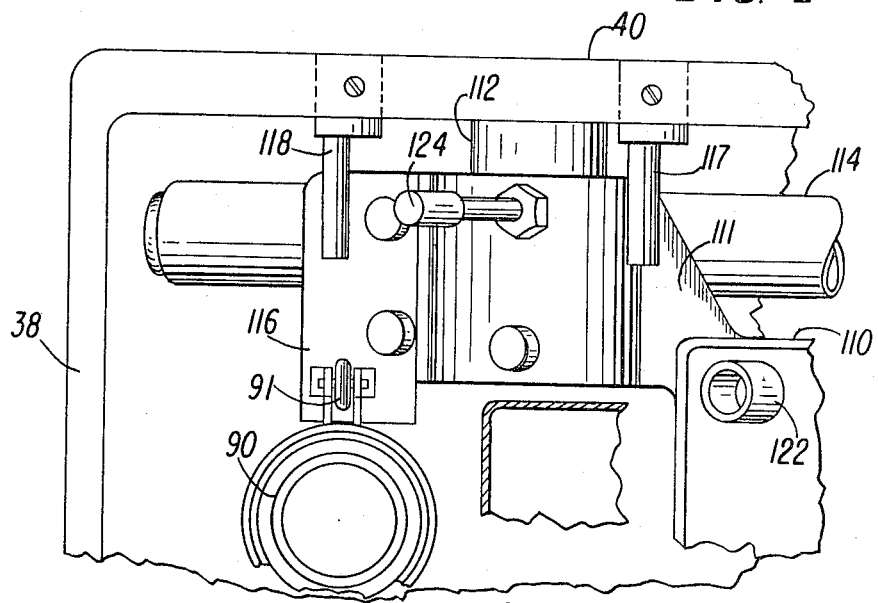
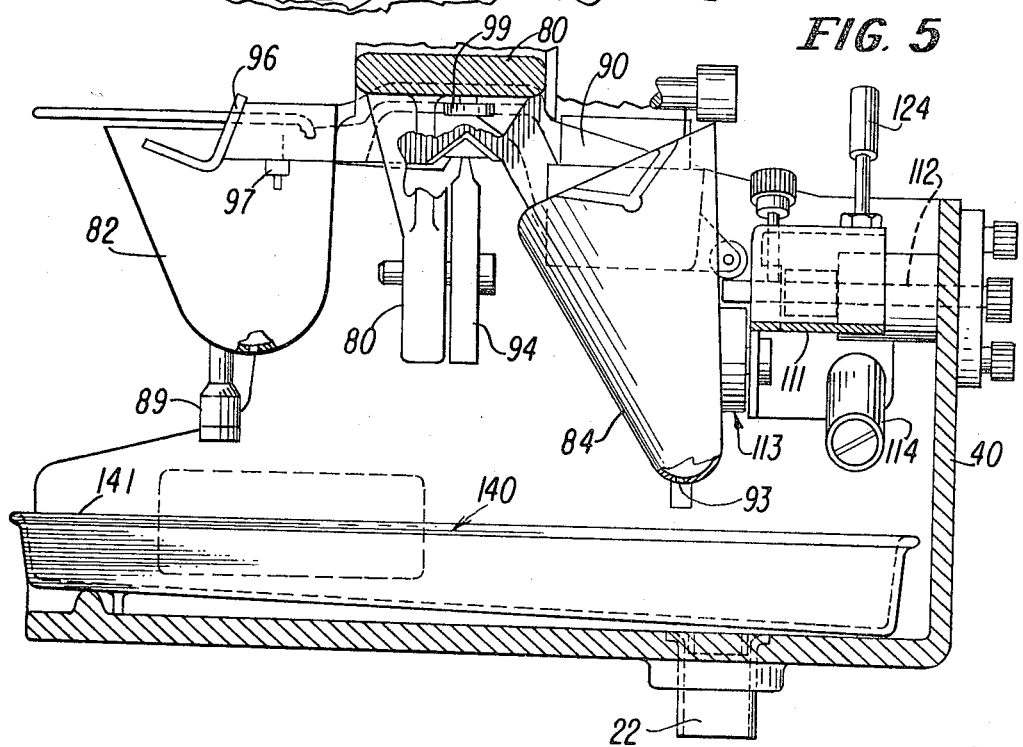
INVENTORS
Raymond Hollis
Frank X. Barr
BY
Stone, Nierman,
Burmeister & Zimmer Attys.

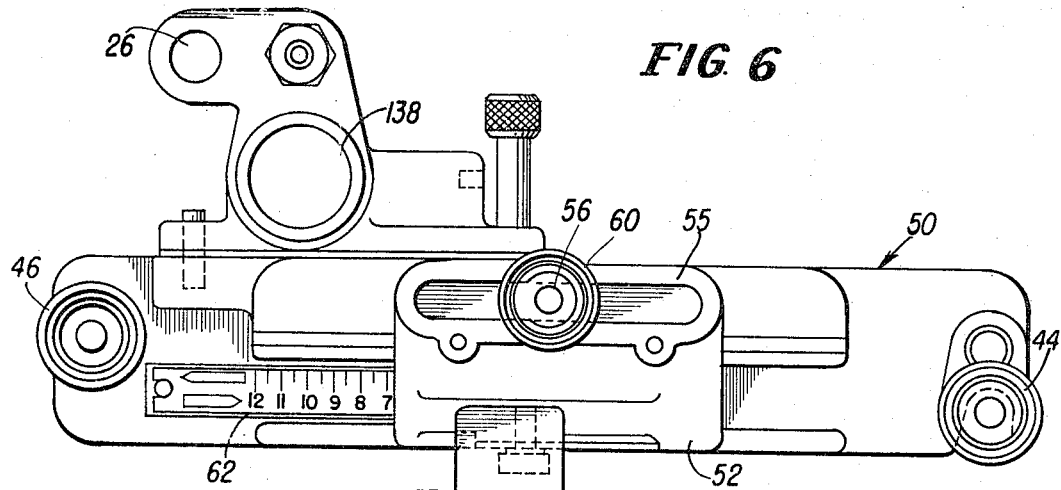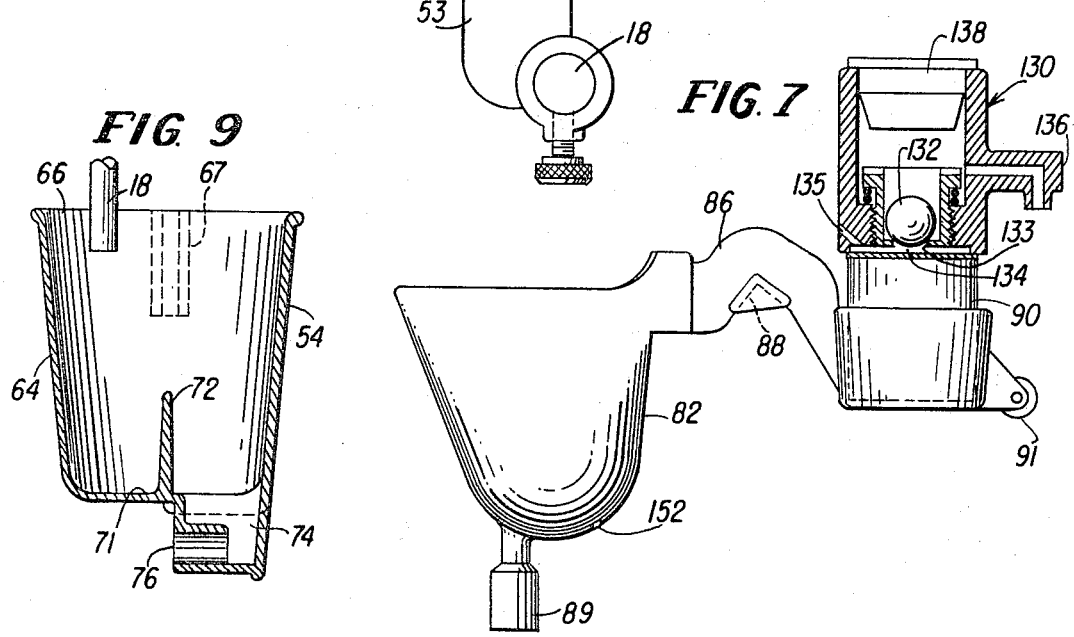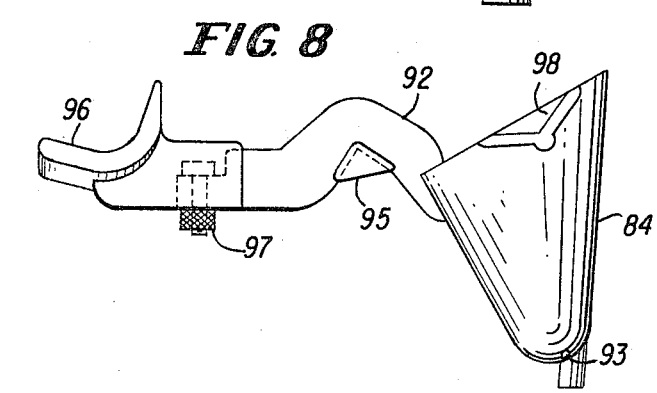

March 14, 1967 R. HOLLIS ETAL 3,308,843
VISCOSITY CONTROL APPARATUS
Filed June 24, 1963 4 Sheets-Sheet 4

INVENTORS
Raymond Hollis
Frank X Barr
BY
Stone, Nierman,
Burmeister + Zimmer Attys.

United States Patent Office 3,308,843
Patented Mar. 14, 1967

3,308,843
VISCOSITY CONTROL APPARATUS
Raymond Hollis, Park Ridge, and Frank X. Barr, Buffalo Grove, Ill., assignors to Graymills Corporation, Chicago, Ill., a corporation of Illinois
Filed June 24, 1963, Ser. No. 290,018
9 Claims. (Cl. 137—92)

The present invention relates to apparatus for the testing and the controlling of viscosity in liquids and more particularly to the use of such apparatus for testing and controlling liquid in a recirculating system.

The present invention is illustrated for use with printing inks where the maintenance of a constant level of viscosity is essential during a high speed printing run. However, it is understood that the invention is useful wherever liquid is recirculated in a system in which the liquid viscosity should be maintained within desired limits. As presently practiced, viscosity controllers are exceedingly complex mechanisms which require intricate control settings and are in the main difficult to clean and maintain.

It is therefore an object of the invention to provide an improved viscosity control system which is simple and inexpensive in construction, which is easy to clean and accessible for maintenance.

It is a further object of the invention to provide a novel and improved viscosity controller for a recirculating system in which the adjustment of the viscosity setting may be made easily with a single manual setting.

It is a further object of the invention to utilize in a novel and improved viscosity control system, components which are readily detachable for cleaning and which are inexpensive so that they may be replaced at little expense.

It is still a further object of the invention to provide a novel viscosity control system which reacts to trouble conditions by maintaining the viscosity at a safe level until the trouble can be cleared.

To effect these and other objects the present invention discloses a system in which liquid from a recirculating system is pumped to a by-pass network in which a sample of liquid is tested for viscosity, and amounts of thinning agent, such as solvent, are added to liquid being returned to the system to maintain the viscosity of the liquid at a constant level. In the sampling network, liquid is fed to a sampling tank which has an orifice in its sidewall adjacent the bottom thereof. From this orifice, liquid is ejected horizontally to describe a trajectory dependent in length on the viscosity and specific gravity of the liquid, once a constant pressure head of liquid is maintained. An actuating receiver is positioned to receive the flow from this trajectory or at least a portion of it. Liquid normally flows out of an orifice in this receiver to a tray from which the liquid returns gravitationally to the recirculating system. When the viscosity of liquid in the recirculating system decreases, more liquid from the tank is received by the receiver due to the greater length of the low viscosity liquid trajectory path. The receiver fills or remains full due to this flow and the added weight of liquid in the receiver tends to counterbalance the weight of a solvent controlling device, and maintains a solvent adding valve in its closed position.

When the viscosity of the liquid flowing from the sampling tank increases, the trajectory of the ejected liquid shortens so that lesser amounts of liquid reach the actuating receiver. The weight of the receiver decreases to a weight less than that of the valve closing device; the closing device then drops gravitationally and as a result the device opens the solvent valve. Opening of the valve allows solvent to flow into a solvent container from which the solvent flows into a tray leading to the pump containing reservoir. The solvent container has an orifice which is proportioned to emit less liquid than the container receives with the solvent valve open. In this way, the weight of this container increases and the container pivots downwardly about its pivotal mounting. Downward movement of the container raises a deflector or plate to a position diverting liquid from the short trajectory path into the actuate receiver. The actuate receiver fills rapidly with the diverted fluid and drops, causing the solvent valve to close. The use of the deflector plate in this way shortens the solvent additive cycle period and effects a short solvent adding cycle which may be repeated as often as necessary. The use of short cycling periods allows a finer degree of control than could otherwise be achieved.

Within this control or by-pass network there is provided an additional feature which is called herein the "fail-safe" feature. It is known in the printing industry, that the use of liquid of too high viscosity adds greatly to ink costs on a long range basis, and that use of liquid of too low a viscosity causes damage to the material being printed. On a short term basis, if a control mechanism were to fail in a manner adding too much solvent to the system, all the matter being printed would be unusable. This principle becomes important where high speed presses are in use. For example, in an instance where a press prints 2400 wrappers a minute, in five minutes 12,000 wrappers are printed and in twenty minutes 48,000 wrappers are printed. It is quite common in the industry for a trouble condition to occur and not be detected for a period ranging up to twenty minutes in duration. With too low viscosity ink being fed to the presses, all the wrappers which were printed during this period would have ink which "washed" on the paper and these wrappers would be ruined and completely unusable. With ink of too high viscosity, a little excess ink would have been used, but the many wrappers having been printed would be usable. It is quite obvious that given the choice of a slight added ink cost for a short period or the loss of an entire batch of labels or wrappers, the better choice would be the save the possible great loss by incurring the slight short term waste. It is this principle which is called herein the "fail-safe" principle.

To provide such a fail-safe feature on the present invention, the solvent container includes a sidewall opening, in addition to the opening in its bottom surface for normal flowage of solvent for addition to the liquid in the system. If too much solvent flows into the container due to any malfunction in the mechanism, the container fills rapidly and overflows through the second opening to a safety receptacle of comparatively large capacity. On an excess amount of solvent reaching this receptacle, the receptacle, through a snap action pivotal mounting, actuates the solvent valve closing device. The valve closes ending the addition of solvent. The valve once closed due to excess of solvent in the receptacle, cannot be reopened without manual reset of the safety receptacle. Thus, an excess of solvent closes off further solvent input until the mechanism is manually reset. This type of valve shut-off may occur where the sampling flow has been obstructed either in the flow of sampling liquid from the sampling tank or in the by-pass hoses. These exemplary trouble conditions would cause a release of the solvent valve closure and the "fail-safe" reaction would stop the addition of solvent until the trouble is cleared. Further, the snap action mounting once actuated may be designed to maintain the valve closed even if the excess solvent drains from the safety receptacle awaiting manual reset.

Within the control mechanism, the construction includes many inexpensive, easily maintained components. For example, the tanks, receivers and containers are constructed of synthetic resin materials which are cheap in cost and may readily be replaced. In addition, replaceable transparent splash shields may be installed about the apparatus to keep liquids from spraying about.

In the general construction, the counterbalance structure employs simple fulcrums which are inexpensive and trouble-free. The solvent valve closing device which doubles as a counterbalance for the activating receiver is inexpensive and reliable in that it is a permanent magnet which attracts a ferrous ball valve for closure of the valve. In operation, the weight of the magnet balances against the weight of the actuating receiver to keep the valve closed. On decrease of the weight of liquid in the receiver, the weight of the magnet is no longer counterbalanced and the magnet gravitationally drops away from the valve. The ball valve is no longer attracted and the valve is opened. The elements may readily be removed from the simple fulcrum mounting to facilitate the cleaning of the device.

In addition, the invention is adjustable in that the sampling tank is mounted on a calibrated cross slide for movement laterally with respect to the actuating receiver so that the proper trajectory distance may be set for liquid of the proper viscosity. The setting is accomplished by visually observing the trajectory path to insure that about half the liquid flow enters the actuating receiver so that it fills sufficiently to cause the receiver to drop. At that position, a knob is tightened to lock the cross slide position at a setting which may be noted for future reference. Once the position has been set, no further settings are necessary during operation.

These and other objects, features and advantages of the invention will be apparent from the following detailed description of a presently preferred embodiment of the invention viewed in conjunction with the accompanying drawings in which:

FIGURE 4 is an enlarged fragmentary plan view of the safety receptacle mounting viewed from the position of FIGURE 3;

FIGURE 5 is a side view in section of the apparatus taken along line 5—5 of FIGURE 3;

FIGURE 6 is a top plan view of the cross-slide assembly construction as used herein;

FIGURE 7 is a side elevational view of the receiver cup assembly and solvent valve closure structure of the apparatus;

FIGURE 8 is a side elevational view of the solvent dispensing container of the invention;

FIGURE 9 is a side elevational view of the sampling tank with its sidewall partially broken away;

Figure 1:
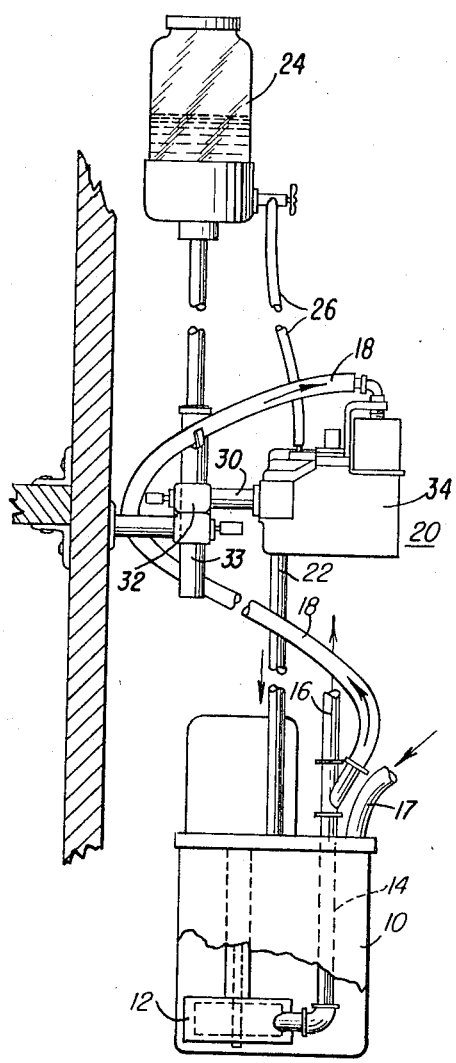
FIGURE 1 is a partially schematic side elevation of a recirculatory system employing the invention.

Turning now to the drawings in detail, FIGURE 1 shows a recirculating system employing the invention. The system has a reservoir or sump 10 which has a large capacity for storing the excess liquid in the system. This reservoir has operably mounted to it motor driven pump 12 which circulates liquid through its discharge conduit 14. The conduit has one connection 16 leading to the utilization area which in the embodiment shown may be the inking rollers of a high speed printing press. This utilization area would, of course, differ depending on the application into which the system is placed and accordingly has not been shown herein. From the utilization area, there is provided a return conduit 17 for returning unused liquid to the reservoir for recirculation.

The outgoing ink being fed to the utilization area is constantly sampled through a by-pass conduit 18 which may be a hose or the like and which functions to divert a stream of liquid from the pump discharge conduit to the sampling and viscosity control apparatus 20. Liquid passes through the sampling apparatus and solvent may be added if necessary, prior to the return of the tested liquid to the reservoir through return connection 22. A supply of solvent is contained in a vessel 24 mounted a distance above the control apparatus and is connected through a valved hose connection 26 to the apparatus to feed solvent when indicated by the sampling. With the system set out, liquid is pumped to the by-pass system constantly during the recirculation of liquid in the system and the liquid in the by-pass is constantly being tested for viscosity and for the necessity of adding more solvent to the liquid.

Figure 2:
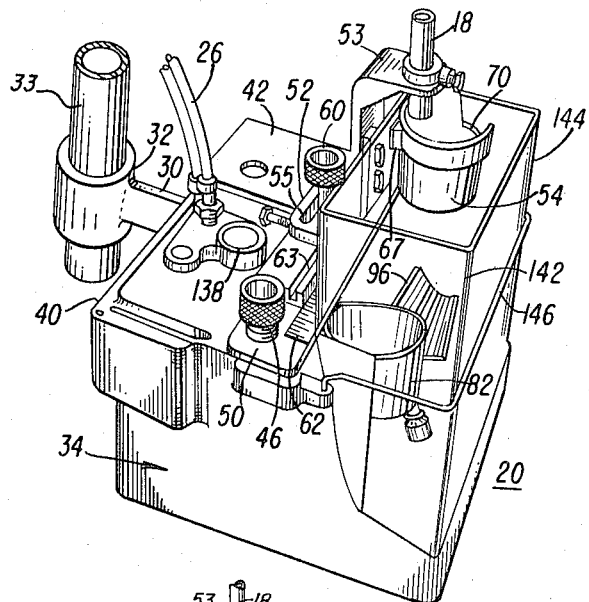
FIGURE 2 is a side perspective view of the control apparatus of the invention in its operative state.
Figure 3:
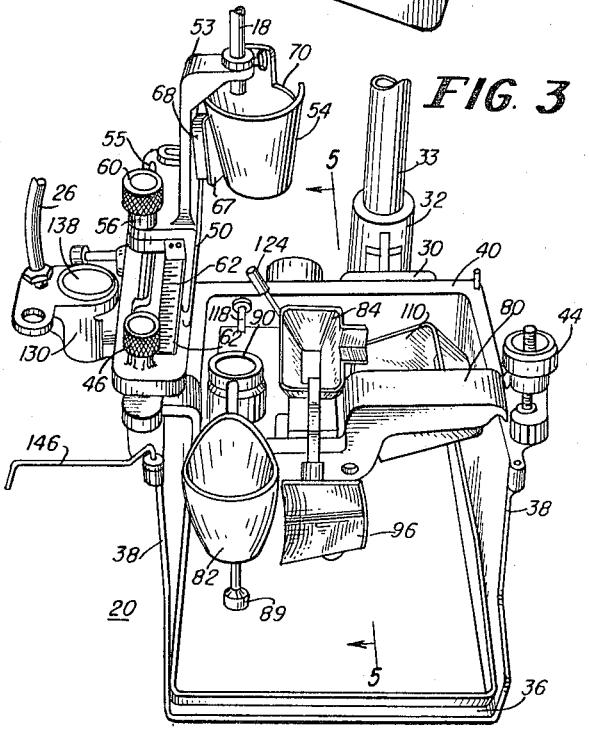
FIGURE 3 is a front perspective view of the apparatus of FIGURE 2 with the guard shields removed and the cover swiveled to a position allowing access to the apparatus interior.
Figure 10:
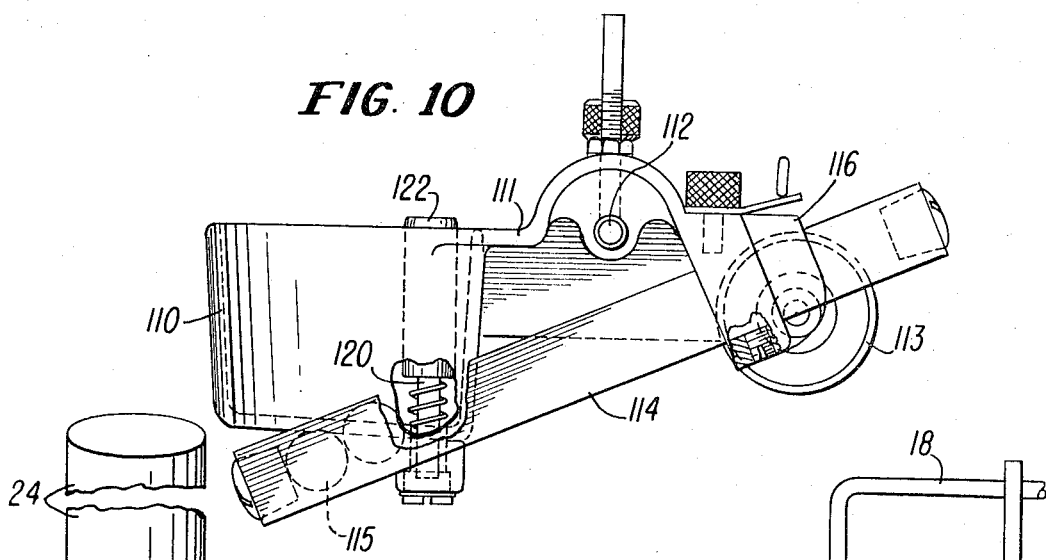
FIGURE 10 is a side elevational view of the safety receptacle assembly of the invention.

Now turning to FIGURES 2 and 3 particularly, these figures show in greater detail the viscosity sampling and control apparatus 20. This apparatus as a unit is mounted on a horizontally extending arm 30 which is connected on a swivel base 32 to vertical shaft 33 to allow the apparatus 20 to be rotated about the swivel providing ready access to all parts of the apparatus. Within the apparatus 20 there is supporting base structure 34 of substantial metallic construction including an imperforate flat bed or floor area 36 with upstanding sidewalls 38 and a rear wall 40. With this construction a shallow basin structure is formed in the flat bed area 36. A rear cover plate 42 is mounted to the rear wall and sidewalls by the mating of pins upstanding from the sidewalls fitting within suitable openings in the cover plate. This rear cover plate covers the rear portion of the basin to prevent the splattering of liquid from the apparatus. At the front of this cover there is extending between the sidewalls a cross slide structure 50 which is affixed to the sidewalls through the use of threaded studs secured to the sidewalls and extending upwardly therefrom. Each stud bears a knurled knob, numbered 44 and 46 respectively to lock the cross slide to the sidewalls. In the showing of FIGURE 3, stud knob 44 has been loosened so that the cross slide is swiveled about the remaining stud which bears knob 46, thereby exposing the interior of the apparatus.

The cross slide structure 50 (shown in detail in FIGURE 6) bears a laterally extending sliding base 52 from which there extends the vertical bracket 53 which bears adjacent its upper end the sampling tank 54 and the end of the conduit 18 which is used to by-pass liquid from the system to the apparatus at the sampling tank. The sliding base 52 has a transverse slot 55 laterally across its surface and in which a stud 56 extends upwardly. A knurled knob 60 mates with stud 56 to position the sliding base and the bracket 53 concurrently therewith. By loosening this knob 60, the sliding base may be moved laterally along the slide member and may then be locked in a desired position by tightening knob 60. A calibrated scale 62 is fitted in the slide member transversely to indicate the position of the slide base along the member. Suitable slide rails 63 upstand in the slide structure 50 to guide the sliding base 52 in its lateral travel.

The sampling tank 54 as shown in detail in FIGURE 9 is cup shaped and made of a suitable synthetic resinous plastic. The tank sidewall 64 tapers slightly outwardly in its upward extent and terminates in an open end 66 in its top surface. It is into this top opening that hose connection 18 projects. At the rear of the tank sidewall there is provided a slide bracket 67 which may be integral to the sidewall and extending rearwardly therefrom for fitting within a mating slide receiver 68 on the bracket 53. This slide connection may be of the generally known type which allows upward movement of the sampling tank 54 for removal but otherwise holds the tank in place with respect to the slide bracket 53.

At one side of the tank, the sidewall is recessed with a slot 70 to a level above the projection of discharge hose into the tank 54. This slot is used to overflow excess liquid from the tank and maintain a constant head of liquid in the tank. The bottom wall 71 of the tank has a divider 72 extending the width of the tank and extending to a height of about one third of the height of the tank sidewall. At the rear of the divider, the tank has a downward tubular extension 74 in the tank base 71 and this extension leads to a horizontally disposed orifice 76. Orifice 76 is in communication with the tank interior at the rear of the divider and serves to eject a stream of liquid horizontally from the tank to describe a horizontal trajectory path from the tank.

As mentioned previously, the coinduit 18 projects into the tank below the normal tank liquid level in the area in front of divider 72. The orifice entrance from extension 74 is at the rear of the divider so that the dynamic effect of the liquid received from the conduit is not transmitted to the orifice. This construction insures that the pressure head at orifice 76 results solely from the static height of liquid in the tank below the level of slot 70.

Extending between the opposed sidewalls 38 of base 34 (FIGURE 3) is a reinforcing cross brace 80 on which are assembled the actuating receiver cup 82 and the solvent dispensing cup 84. Each of these elements, 82 and 84 is substantially cup shaped, is made of suitable synthetic resin and each has an orifice in its bottom surface. Receiver cup 82 and solvent container 84 are mounted on separate parallel pivot arms, these elements being mounted at opposed ends of the respective separate pivot arms. The receiver cup 82 is mounted on its pivot arm 86 through the use of mating slide mount bracket of the type previously described in the description of the mounting of the sampling tank 54. Cup 82 is held in position forward of crossbrace 80 by arm 86, which in turn rests at its midpoint on a fulcrum 87 which is mounted on the crosssbrace 80. This fulcrum provides a line contact surface at its upper end, the arm 86 having a triangular cap 88 which fits over the fulcrum to comprise a simple, readily detachable pivot system. At the rear end of pivot arm 86 (the end opposed to that on which the receiver cup is mounted), arm 86 has mounted thereon a permanent magnet holder with a cylindrical permanent magnet 90 protruding upwardly therefrom. The magnet is fitted tightly in the holder and is balanced against the weight of the receiver cup and weight 89 which may be mounted with the receiver cup. This magnet has a greater weight than the combined weight of cup 82 when empty and the cup weight 89, so that the magnet usually assumes the lowered position shown in FIGURES 3 and 5.

The receiver cup 82 is positioned in the path of liquid emitted from orifice 76 of the sampling tank. On filling of the cup to a predetermined amount, the cup and its contents overbalance the weight of the magnet and raise the magnet by the resutling pivotal motion. To complete the description of the construction of the pivot arm 86 and its members, it can be seen in FIGURES 4 and 7, that arm 86 at its end outward of magnet 90 terminates in a wheel 91 which may rotate freely about its horizontal axis. The functioning of this wheel will be explained more fully in the explanation of the operation of the apparatus.

Parallel to pivot arm 86 is a second pivot arm 92 which bears at its rear end the solvent dispensing container 84. Container 84 is cup shaped and includes in its bottom surface a small dispensing opening 93. Pivot arm 92 rests on fulcrum 94 which is secured to the cross brace. The arm 92 has a triangular cap 95 which fits over the fulcrum in line contact, the cap 95 seating the pivot arm 92 on the culcrum. A settable headed stud 99 is threadedly affixed to the underside of brace 80 above cap 95 to restrain the cap from movement off the fulcrum. A similar stud, not shown, is positioned above cap 88 to serve a similar function. At its front end, pivot arm 92 bears a curved deflector plate 96 and such weights 97 as are necessary.

The balancing of the container and deflector plate is such that when the container 84 is empty or nearly so, the combined weight of the deflector 96 and weight 97 overcomes that of the container 84. In this condition, the deflector plate assumes a position below the upper edge of the receiver cup and is inactive until the container 84 fills with solvent, at which time its weight increases to overcome that of the deflector plate, and the plate is raised to a position adjacent the trajectory path leading from orifice 76 of the sampling tank to the edge of the receiver cup. The deflector plate in this position diverts liquid which would otherwise miss receiver cup 82 into cup 84 as will be explained more fully. Container 84 has a slight depression in its upper edge on the container rim on the side away from the magnet 90. This depression is V shaped and comparatively shallow, and its lower edge leads into an outwardly disposed lip 98 which serves to channel overflow solvent from the container toward a safety receptacle 110 positioned below the lip.

Receptacle 110 is mounted pivotally in a position below the lip but clear of flow out the bottom dispensing opening 93 in the container bottom surface. The receptacle is mounted on a pivotal arm 111 which rotates about a shaft 112 which is affixed to the rear wall 40 of the apparatus structure. Pivot arm 111 is disposed substantially normal to and below the previously discussed pivot arms 86 and 92. At the end of pivot arm 111 opposite the receptacle mounting, the arm 111 bears a counterweight 113 in the form of a roller or wheel. Connected to the arm 111 for movement therewith adjacent the counterweight is a hollow tube 114 which has a plurality of steel balls movable therein. The tube is firmly affixed to the pivot arm 111 with a greater portion of its length at the receptacle end of the mounting and its shorter length adjacent the counterweight. Also mounted on the counterweight end of arm 111 is a generally horizontal platform 116 on which the roller wheel 90 rides.

With this configuration, the receptacle 110 is positioned with its pivot arm 111 at rest against stop pin 117. The receptacle 110 is thus positioned to receive overflow solvent from the container 84 and on receipt of an amount sufficient to counterbalance the weight at the other end of arm 111, the receptacle 110 drops gravitationally and raises platform 116 to push the magnet 90 upwardly. On the dropping of the receptacle 110, the tube 114 also pivots and the steel balls 115 fall to the receptacle end of the tube. As shown in FIGURE 4, the combined weight of balls 115 and tube 114 is sufficient to hold the lowered position of the receptacle by the added weight. This tube action provides a snap action which in effect locks the receptacle 110 in a tripped or lowered position against pin stop 118. The receptacle 110 is imperforate and has a manually operable valve 120 which is spring loaded to a closed position. The valve has a stem 122 which is biased to a closed position and must be manually depressed to open the valve and empty the receptacle 110 of solvent, once the receptacle has received solvent.

The structure of the receptacle 110 includes arm 111, counterweight 113, tube 114 and platform 116 all movable together from the normal position engaging stop pin 117 to a tripped position engaging stop pin 118. In the tripped position, magnet 90 is maintained in its raised position. To restore receptacle 110 there is provided a handle 124 extending through cover 42 (not shown) to allow reset.

Positioned above the permanent magnet 90 when the top cover 42 is in its closed position (operative position of FIGURE 2) is a valve mechanism 130. This valve mechanism is used to control the amount of solvent supplied from vessel 24 which is fed into the circulatory system. The valve has as its only operative element a ball 132 of stainless steel or other non-corrosive ferrous material. This ball sits within a thimble 133 of brass or the like. Below the thimble is a small chamber 134 which is in communication with the solvent inlet connection 26 through a small inlet tube 135. The ball is held in the thimble seat 133 by the attraction of magnet 90, when the magnet is in its raised position. With the magnet in this raised position, the ball is held in the thimble to prevent solvent from rising out of the valve chamber 134. Above the level of the thimble 133 is an outlet conduit 136 which feeds solvent receiver 82. A suitable, removable plug or cap 138 may be fitted into the top opening of the valve to close off the valve in a manner allowing ready removal of the plug for cleaning or maintenance.

Disposed within the flat bed 36 of the base structure 34 is a tray 140 which is rectangularly conformed to fit within sidewalls 38. The tray has upstanding walls and a generally imperforate bottom with an opening designed to fit into return connection 22. The tray may be of any suitable readily replaceable material such as resinous plastic or the like. In addition there may be provided an inner splash shield 142 which is a single sheet of transparent material (shown only in FIGURE 2) resting against the crossbrace 80 to isolate the solvent area at the rear of the crossbrace from the area forward of the brace. The bottom edge of shield 142 is suitable spaced a short distance above the tray to allow liquid to flow freely within the tray 140 and to mix there prior to their return to the system. An outer shield 144 which may be clear polyvinyl or the like may be mounted covering the open sides of the base (shown only in FIGURE 2). This outer shield is a hollow rectangle fitted into the sidewalls 141 of tray 140 within sidewalls 38 of the base 34. A holding rod 146 may fit about shield 144 and mount in suitable openings in top cover plate 42 to hold the shield in place as shown. These shields, tray and the containers are all easily removable for cleaning and once removed allow easy access to the apparatus components for cleaning or servicing. These shields, may be made as inexpensively as possible so that they are readily replaceable as required. Thus, these elements may be molded of inexpensive plastic materials; transparent if desired or opaque where visibility is not a factor. In addition, all hoses and conduits may be made of clear polyvinyl or nylon as desired for ease of cleaning and ease of replacement.

Figure 11:
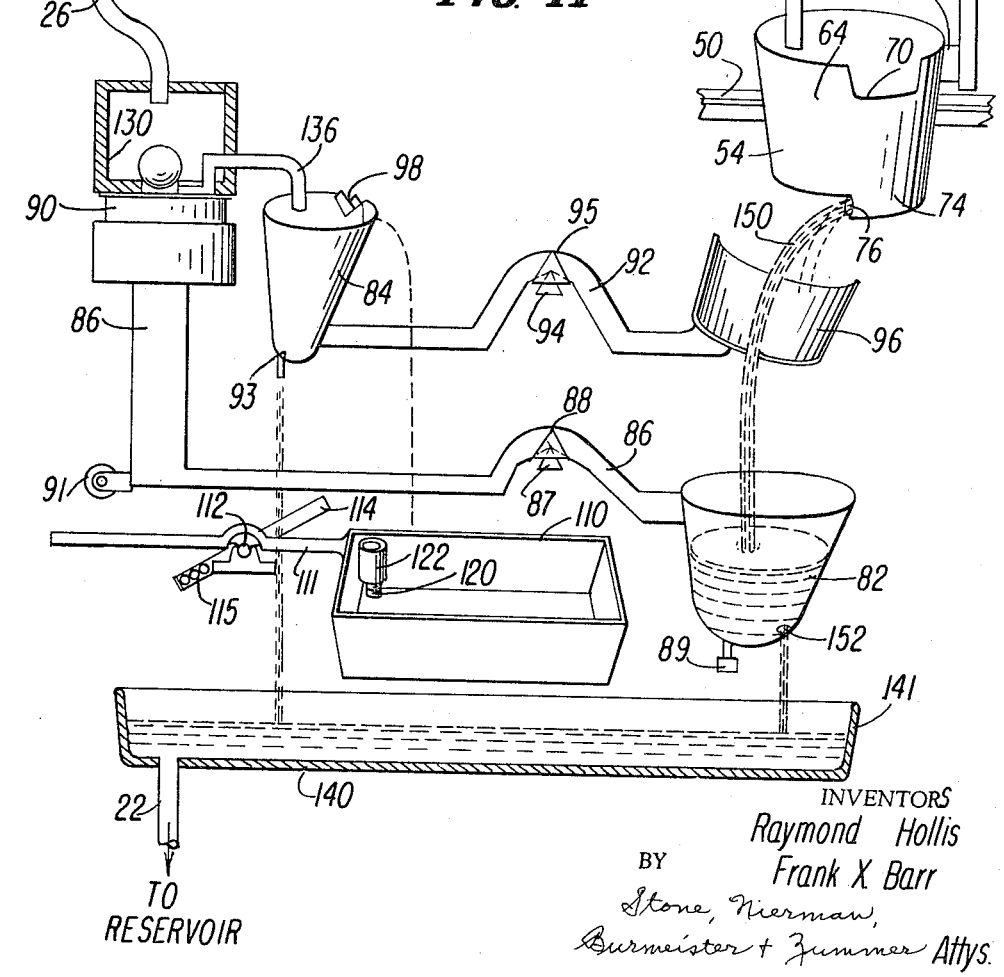
FIGURE 11 is a schematic diagram illustrative of the operative functioning of the apparatus.

In FIGURE 11 there is shown a schematic representation of the entire apparatus 20 reduced to its operative components only. In operation, liquid from the pump 12 is discharged through by-pass conduit 18 for flow into the sampling tank 54 at a constant rate. This flow creates a constant pressure head of liquid in tank 54 adjacent orifice 76. Liquid is ejected through this orifice horizontally from the bottom tank extension 74 with a constant pressure head. The pressure head generates a horizontal stream of liquid 150 from orifice 76. This stream describes a trajectory path the horizontal length of which is determined by the viscosity of the liquid in the recirculating system.

As mentioned previously, the sampling tank 54 is slideable along cross slide structure 50 in a direction parallel to crossbrace 80. Moving of the tank also moves the inlet conduit 18 a like amount so that the sampling liquid always flows directly into sampling tank 50. The machine operator loosens slide control knobe 60 and sets the position of the cross slide structure 50 at a position in which the trajectory stream 150 is virtually split in half by the near sidewall of the receiving cup 82. The half of the stream striking the cup exterior will cascade into the tray 140 for return through hose 22. The operator may note the calibration reading on scale 62 at this position for future reference. Knob 60 is tightened in place at this position and the viscosity control apparatus has been set for operation by this simple one step setting.

The portion of the trajectory stream entering the receiving cup 82 will fill the receiver partially and thereafter the cup 82 will drain through a single opening 152 in the receiver cup base for return flow to the mixing tray and subsequent return to the recirculatory system. The partial filling of the cup must be judged visually by the operator on making the initial setting to insure that cup 82 fills initially to at least its half full condition prior to setting the operative position of the sampling tank 54 on cross slide structure 50. With the receiving cup filled at least to its midway level, the combined weight of the cup 82 and the liquid it bears is sufficient to counterbalance the weight of permanent magnet 90, to thereby hold the magnet 90 in its raised position adjacent ball valve 130. Maintenance of the magnet in the raised position maintains ball valve 130 closed and no solvent is added to the system. It should be noted that bottom opening 152 in cup 82 is sized to emit an amount of liquid less than equal to the amount received from the trajectory stream. In this equilibrium state, the cup 82 remains in the condition as originally set overbalancing the magnet weight.

The pump continues to circulate liquid through the entire system at the desired viscosity level until some of the solvent in the liquid of the system has evaporated causing a preponderance of heavy fluid in the liquid. The viscosity of liquid will rise throughout the system. Naturally, the viscosity of the liquid passing into and through the sampling tank 54 will increase also. As the viscosity of the liquid in the trajectory stream 150 leaving tank 54 increases, the length of the horizontal trajectory path decreases, the liquid falls short of the cup 82 and drops into tray 140 for recirculation. As less liquid reaches receiver cup 82 the volume of liquid in the cup decreases rapidly, due to the liquid flowing out bottom opening 152 with little or no replacement liquid reaching the cup. The weight of the cup decreases and becomes less than the weight of the permanent magnet 90. The magnet then drops away from valve 130, and ball 132 is moved upwardly by the buoyant force of the solvent. Solvent then flows out of solvent feed line 136 and flows into solvent dispensing container 84. Solvent from container 84 flows out of the container through bottom opening 93 and drops into tray 140 from which the solvent passes into the recirculating system.

Solvent container opening 93 is sized to allow a small amount of flow as compared with the amount of solvent received from the solvent feed. An output flow of one-fourth of the amount received has been found to work quite well in such a system. As solvent flows into container 84 faster than it flows out, the container fills rapidly. As the container fills, its weight increases to a weight greater than that of deflector 96. The container drops and the deflector rises. The deflector on rising assumes a position tangent to the path of flow of liquid in trajectory stream 150 and diverts a large portion of the liquid in the stream toward actuate receiver cup 82. Cup 82 fills rapidly and then overcomes the magnet weight and drops gravitationally, raising magnet 90 to its raised position. In the raised position, manget 90 attracts ball 132, and closes valve 130 shutting off the solvent feed to container 84. This deflector action tends to decrease the period of a solvent adding cycle and as a result decreases the amount of solvent added.

Solvent from container 84 continues to drain into the tray thereby lowering the viscosity of liquid being within the system. The viscosity of liquid being circulated is thereby lowered and the trajectory of liquid in stream 150 lengthens causing more liquid to reach cup 82. If enough solvent has not been added following the closure of valve 130, the apparatus will recycle in the manner previously described to add another fill of solvent to the mixing tray. Each cycle is fairly short in duration to provide a small added quantity of solvent on each cycle. In this way, a sensitive control is effected by providing a short cycle with constant sampling.

An added feature of the invention is afforded in the use of safety receptacle 110. It will be recalled that receptacle 110 is pivotally mounted below solvent container 84 in a position out of the path of solvent flowing from bottom opening 93. When an excess amount of solvent is fed from the solvent supply due to malfunctions in the apparatus such as plugging of the pump line 18 or blockage or orifice 76, the solvent container 84 will fill. As the solvent level in the container reaches its top, solvent will flow out through its wall indentation and on to lip 98 for flow into receptacle 110. As the amount of solvent in the receptacle increases, the weight acting on pivot arm 111 increases to a value greater than the weight of counterweights 113, 114, and 115. The receptacle thereby drops and raises the counterweights and platform 116. Platform 116 pushes on wheel 91 and raises magnet 90 to its raised position closing valve 130. The solvent in the receptacle 110 remains and does not decrease except by evaporation and the balance condition remains with solvent valve 130 closed. Also, as the receptacle 110 drops, the balls 115 within tube 114 roll to the end shown in FIGURE 9 creating a snap action on the magnet closing the valve. Once the balls have travelled to the end shown, they remain in that position even if the solvent drains from the receptacle 110. Once the balls 115 have moved to the receptacle end of the tube, they must be reset manually by the machine operator.

Consequently, on a malfunction of the control apparatus, the solvent supply is shut off and remains shut off. The liquid in the system may automatically thicken due to solvent evaporation and may use too much ink solids or the like until the condition is detected. This condition however does not ruin the subject matter being printed, as would occur on the addition of an excess of solvent. As mentioned, addition of an excess of solvent causes printing to wash over the subject matter being printed rendering it completely unusuable. Using the safety receptacle construction set out herein, the present apparatus fails on what is called the safe side (to high viscosity lqiuid) on the occurrence of a malfunction.

When the operator notices the high viscosity situation following a period which may last anywhere from five to twenty minutes under modern printing conditions, he then may add solvent manually or may shut down the press and look for and clear the trouble condition causing the malfunction. Once the trouble condition has been cleared, he then depresses valve stem 122 to open valve 12 and release the excess solvent from the receptacle into the tray 140. He then resets the receptacle 110 by manipulating arm 124 and the apparatus is automatically reset. The press down-time is kept to the minimum necessary to clear the trouble and is lengthened only by the comparatively short emptying time for receptacle 110 to reset. This safety feature has been found to prevent considerable losses in printing matter as illustrated previously.

In the claims, the words "paper converting ink and coating liquid" identify printing inks and coatings, particularly rotogravure and flexographic inks and those coatings used by the trade in converting a white paper to a colored paper, as distinguished from coatings used in the manufacture of the paper. "Paper converting" is a term used in the trade, and primarily refers to printing inks, but in printing establishments that need a large variety of colored papers, it has become practice to buy white paper and then right in the printing press, coat it with a background of a different color.

While there has been described what is at present thought to be a preferred embodiment of the invention, it will be understood that modifications may be made therein and it is intended to cover in the appended claims, all such modifications as fall within the true spirit and scope of the invention.

What is claimed is:

1. An apparatus for controlling the viscosity of a paper converting ink and coating liquid circulating in a closed system, comprising: a by-pass network for testing liquid in circulation in said system, movable means in said network responsive to the viscosity of the liquid thereof, a supply of low viscosity liquid, valve means responsive to said movable means for controlling the addition to the system of low viscosity liquid from said supply, a dispensing contained positioned to receive low viscosity liquid from said supply for dispensing liquid into said system; and means for preventing an overfill of low viscosity liquid to said system on malfunctioning of said network, said overfill preventing means including a receptacle positioned adjacent said dispensing container to receive excess amounts of liquid received by said dispensing container, means mounting said receptacle for movement in response to the receipt of excessive amounts of liquid from said container, and means responsive to the movement of said receptacle for closing said valve to cut off the liquid from said supply.

2. An apparatus as claimed in claim 1, in which said receptacle mounting means comprises a snap-action device responsive to said receptacle movement for locking said receptacle in a valve-closed position requiring manual reset.

3. An apparatus for controlling the viscosity of a paper converting ink and coating liquid circulating in a closed system, including means for directing a test stream of liquid from the liquid in said system, a receiver positioned to receive a portion of said test stream, a supply of low viscosity liquid, a valve mechanism controlling the outflow of low viscosity liquid from said supply, a valve controller normally positioned to hold said valve mechanism in a closed position shutting off said supply, means mounting said receiver for movement in response to the diminution of liquid received by said receiver from said test stream, means mounting said controller responsively to a loss of weight movement of said receiver for causing said valve to open said supply, a dispensing container positioned to receive flow from said open valve for dispensing said low viscosity liquid to said system, a low viscosity overfill prevention device including a receptacle positioned adjacent said container for receiving excess amounts of low viscosity liquid emitted from said container, and means mounting said receptacle for movement in response to the receipt of excess amounts of liquid by said receptacle, said mounting means responsive to the movement of said receptacle for acting upon said valve controller to close said valve mechanism to shut off further flow of viscosity liquid from said supply.

4. A viscosity controller for use in a constantly recirculatory system wherein paper converting ink and coating liquids are continuously by-passed from said system for testing, the testing and control apparatus comprising: means providing a constant pressure head of liquid from said-by-pass and for converting said head into a horizontal trajectory of desired length, means receptive of said trajectory and responsive to changes in the length of said trajectory due to changes in the viscosity of liquid being by-passed from said system, a valve mechanism controlled by the response of said receiver for feeding low viscosity liquid to a dispensing cup, said cup being mounted on one end of an arm pivoted on a horizontal fulcrum, a deflector plate mounted on the other end of said arm and movable into the trajectory of the liquid whereby lowering the dispensing cup will raise the deflector plate to divert liquid back to said receiver.

5. A controller as claimed in claim 4, wherein said means receptive of said trajectory comprises a pivotally mounted cup, a magnet, a pivot arm including said cup at one end and the magnet at the other, and wherein said valve mechanism comprises a magnetically responsive mechanism, and said cup is pivotal in response to the decrease in length of said trajectory indicative of low viscosity in said system for moving said magnet away from said valve mechanism to open said valve mechanism.

6. For maintaining the viscosity of a liquid containing a solvent volatile in air in a system wherein the liquid is pumped from a reservoir through a delivery duct to the point of use and thence returned to the reservoir, a viscosity control apparatus comprising a liquid by-pass line adapted to be positioned between the delivery duct and the pump intake of the system, a supply of said solvent, a valve controlling the solvent supply, means responsive to a higher viscosity of liquid in the by-pass line for opening said valve and adding a selected quantity of solvent to the liquid in the by-pass line, and means for immobilizing said opening and adding means until a selected period of time has lapsed.

7. The viscosity control apparatus of claim 6, wherein the responsive means comprises a free arching stream of liquid in a chamber in the by-pass line into a receiver actuating cup, and a lever train responsive to a lowering of the cup due to weight of the liquid for closing the valve from the solvent supply.

8. The viscosity control apparatus of claim 7, wherein the immobilizing means comprises a solvent dispensing cup positioned to receive solvent when said value is open, said cup being mounted at one end of an arm pivoted on a horizontal fulcrum, a deflector mounted on the other end of the arm to intercept the free arching liquid and direct it back into the receiver actuating cup for temporarily immobilizing the apparatus regardless of the viscosity of the liquid in the by-pass line.

9. The viscosity control of claim 7, wherein the valve is a ball held seated by a movable magnet, said magnet being mounted on one end of a fulcrummed arm having the receiver actuating cup on its other end.

References Cited by the Examiner
UNITED STATES PATENTS

| | | | |
|---|---|---|---|
| 1,577,555 | 3/1926 | Beadle | 137—92 |
| 2,309,910 | 2/1943 | Kott | 137—92 X |
| 2,572,351 | 10/1951 | Kershaw | 137—92 |
| 2,590,538 | 3/1952 | Huck | 137—92 |
| 3,025,232 | 3/1962 | Jones | 137—4 X |

CLARENCE R. GORDON, *Primary Examiner.*

WILLIAM F. O'DEA, *Examiner.*